United States Patent [19]

Seilly et al.

[11] 4,355,620
[45] Oct. 26, 1982

[54] FUEL SYSTEM FOR AN INTERNAL COMBUSTION ENGINE

[75] Inventors: Alec H. Seilly, North Wembley; Dorian F. Mowbray, Burnham; John E. Mardell, Uxbridge; Michael J. Davison, London, all of England

[73] Assignee: Lucas Industries Limited, Birmingham, England

[21] Appl. No.: 94,720

[22] Filed: Nov. 16, 1979

[30] Foreign Application Priority Data

Feb. 8, 1979 [GB] United Kingdom ............... 7904536
Mar. 3, 1979 [GB] United Kingdom ............... 7907556

[51] Int. Cl.³ ............................................. F02M 51/04
[52] U.S. Cl. ..................................... 123/499; 123/497
[58] Field of Search ....................... 123/499, 497, 498

[56] References Cited

U.S. PATENT DOCUMENTS 4,180,037 12/1979 Hobo ................................. 123/499
4,217,862 8/1980 Fort ................................... 123/497

FOREIGN PATENT DOCUMENTS

2712008 9/1977 Fed. Rep. of Germany ...... 123/497

Primary Examiner—Charles J. Myhre
Assistant Examiner—Carl Stuart Miller

[57] ABSTRACT

A fuel system for an internal combustion engine includes a pump/injector having an actuating winding to which power is supplied by a first electronic means. A first control signal is supplied by a second electronic means to energize the winding and a second control signal is supplied by a third electronic means to de-energize the winding. The third electronic means calculates the time at which the winding should be de-energized to allow the piston in the pump to draw in the required volume of fuel, the second electronic means causing delivery of fuel when the required volume of fuel has been drawn into the pumping chamber of the pump.

10 Claims, 7 Drawing Figures

FUEL SYSTEM FOR AN INTERNAL COMBUSTION ENGINE

This invention relates to a fuel system for an internal combustion engine of the type in which fuel is injected into a combustion space of the engine, the system being of the kind comprising an injection nozzle positioned on the engine so that fuel delivered to the nozzle will be injected into the combustion space and an injection pump for delivering fuel to the nozzle in timed relationship with the associated engine.

Such systems are known for a multi cylinder engine in which a plurality of pumps are actuated by cams respectively carried by a cam shaft driven by the associated engine. The pumps are usually mounted in a common body and the output of each pump is controlled by a single control member the setting of which is determined by a mechanical governor. The pumps have to be carefully adjusted prior to use to ensure so far as is possible, that each pump delivers the same amount of fuel and at the correct time for a given setting of the control member, to injection nozzles respectively on the engine. The mechanical governor must be carefully constructed to control the setting of the control member and usually it is necessary to provide some form of timing adjusting device in the drive to the camshaft to provide timing variation in accordance at least with speed. The design and construction of the governor and timing devices is not easy particularly where great accuracy of fuel quantity and timing is required. Moreover, the provision of the drive from the engine to the camshaft often presents the engine manufacturer with design problems.

Fuel systems have been designed which attempt to overcome at least some of the problems outlined above. For example systems are known in which fuel at high pressure is stored in an accumulator and either delivered to the engine directly through the nozzles, the nozzles for this purpose employing suitable valves, or the fuel at high pressure is utilized to actuate individual pumps again under the control of valves which may be operated electrically. Such systems have the advantage over the previously described system that the control of the aforesaid valves can be effected by electronic circuits constructed to perform the governing and timing function. In this respect electronic circuits can be designed to provide more accurate control than can be obtained with the mechanical devices. However, it is still necessary to generate the high fuel pressure and the generation of the high fuel pressure is usually achieved by an engine operated pump. Moreover, the valves need to be capable of controlling the flow of fuel at high pressure and the design of such valves to ensure that they do not require much power to operate same is not easy.

The object of the present invention is to provide a fuel system of the kind specified in a simple and convenient form.

According to the invention, in a fuel system of the kind specified the pump comprises a piston movable in a bore to vary the size of a pumping chamber, resilient means biasing the piston in a direction to increase the size of the pumping chamber, electromagnetic means operable to move the piston against the action of the resilient means to displace fuel from the pumping chamber through the associated nozzle, a valve controlled fuel inlet to said pumping chamber and through which fuel can flow into the bore from a source of fuel when the piston is moved by the action of the resilient means, the system including first electronic means for supplying power to the electromagnetic means when delivery of fuel by the pump is required, second electronic means for providing a first control signal to said first electronic means when it is desired to energize the electromagnetic means, third electronic means for providing a second control signal to said first electronic means to cut off the supply of power to said electromagnetic means thereby to allow fuel to flow into the pumping chamber, said third electronic means being operative to determine from signals supplied to it, the time required for the pumping chamber to fill with the desired quantity of fuel thereby to determine the instant the second control signal is supplied, fourth electronic means for determining the desired amount of fuel to be supplied to the engine and fifth electronic means for determining the desired timing of delivery of fuel, the signals provided by said fourth and fifth electronic means being supplied to said third electronic means.

Examples of fuel systems in accordance with the invention will now be described with reference to the accompanying drawings in which:-

Figure 1:
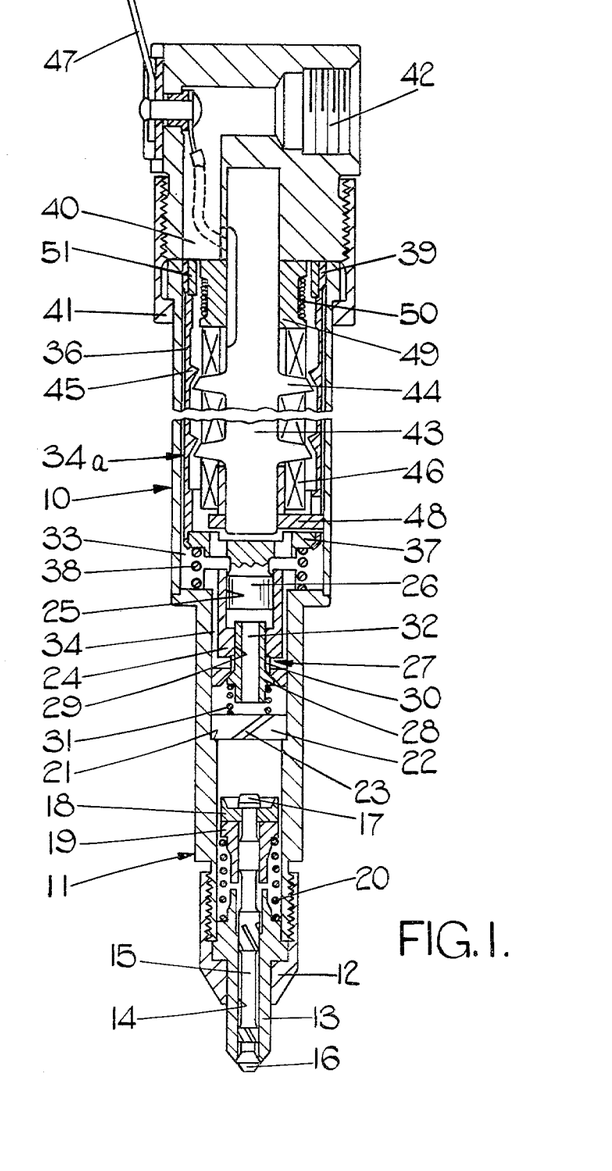
FIGS. 1, 2 and 3 are each sections through parts respectively of three examples of combined fuel pumps and injection nozzles.

With reference to FIG. 1 of the drawings, an internal combustion engine is provided with a plurality of combined fuel pumps and injectors 10 hereinafter called pump/injectors. In use, the pump/injectors are mounted on the engine so that fuel can be injected into the combustion chambers of the engine respectively. Each pump injector 10 comprises a hollow cylindrical stepped body 11 the narrower end of which is screw threaded to receive a retaining nut 12 which retains on the body, a nozzle head 13. The nozzle head 13 has an end portion of conical form in which is defined a seating located at the end of a centrally disposed bore 14. Located within the bore is a valve member 15 which has a head 16 for co-operation with the aforesaid seating. The valve member 15 is guided for movement within the bore 14 by fluted portions integrally formed with the valve member and the diameter of the valve member is such that it can be passed through the bore 14. At its end remote from the head the valve member has a portion 17 against which is located a locking member 18 which has a lateral slot to permit it to be located about a reduced portion of the valve member beneath the portion 17. The locking member retains a spring abutment 19 in position and located between the spring abutment 19 and a portion of the nozzle head is a coiled compression spring 20 which biases the head 16 into contact with the seating.

The body 11 is provided with a central bore into which extends a portion of the nozzle head 13 and the latter is provided with a flange which is held in sealing engagement with the end of the body 11 by the retaining nut 12. Alternatively the flange may be secured by rolling a reduced end portion of the body over the flange or by electron beam welding the flange to the body.

Extending into the bore in the body 11 is a cylindrical flanged valve mounting 24. The mounting 24 is retained in the bore by means not shown and within the mounting there is formed a stepped bore. The wider portion 25 of the bore constitutes a cylinder for a piston 26. The intermediate portion 29 of the bore accommodates a valve element 27 and a slightly enlarged portion 30 of the bore is shaped at its end to define a seating for a valve head 28 forming part of the valve element 27. The valve head 28 is biased into contact with the seating by means of a light coiled compression spring 31 and extending through the valve element is a passage 32. The spring 31 seats against a member 22 which is located against a step 21 in the bore in the body, the member 22 having a peripheral groove or grooves 23 along which fuel can flow. The portion 30 of the bore communicates with a chamber 33 defined in an enlarged portion of the body 11 by way of longitudinal grooves 34 formed in the outer surface of the valve mounting and which are connected by transverse drillings to the aforesaid portion 30 of the bore.

The valve element projects into the aforesaid cylinder and it can be engaged as will be described, by the piston 26.

An electromagnetic means generally indicated at 34a, is located within the chamber 33 for moving the piston 26 in the direction to displace fuel from the cylinder 25. The electromagnetic means comprises a thin walled armature 36 this being of tubular form and being connected to a plate like part 37 which is integrally formed with the piston 26. The plate like part is provided with apertures extending therethrough to facilitate the flow of fuel and it also serves as an abutment for a coiled compression spring 38 which biases the piston 26 away from the valve element. The armature is guided for movement by the piston 26 and at its other end by an enlargement 39 slidable on the interior surface of the body 11.

The open other end of the body 11 is closed by an end closure 40 which is retained in position by means of a retaining nut 41, this engaging a flange on the body. The end closure defines a fuel inlet 42 which communicates with the chamber 33 and it also supports a stator assembly which comprises a rod 43 formed from magnetizable material. The rod 43 extends within the armature and it is provided with a pair of helical ribs 44. The interior surface of the armature is also provided with helical ribs 45 and the presented surfaces of the ribs 44 and 45 are inclined to the longitudinal axis of the pump/injector. In addition the surfaces are spaced from each other in the de-energized condition (as shown) of the electromagnetic means.

In the two grooves defined between the ribs 44 is located a pair of windings 46. The windings conveniently are formed by winding wire along one groove from one end of the rod and returning along the other groove to the same end of the rod. The windings have a plurality of turns and when electric current is supplied thereto the flow of current in the windings in the two grooves is in the opposite direction so that the ribs 44 assume opposite magnetic plurality. The end connections of the windings are connected to terminal pieces indicated at 47 and mounted on the end closure 40. If desired one end may be connected to the body of the pump/injector in which case only a single connector is required.

The extent of movement of the armature under the action of the spring 38 is limited by the abutment of the armature with the end closure and furthermore, the armature is retained against angular movement by means of a locating member 48 which is secured to the rod at its end adjacent the piston and which extends through an aperture in the armature.

The pump injector also incorporates a transducer for providing an indication of the position of the armature. The transducer comprises a core member 49 which is located about the rod 43 at the end thereof adjacent the end closure 40. The core member is provided with a circumferential groove in which is located a winding 50 and the armature mounts a ring 51 formed from magnetizable material and which as the armature moves, alters the reluctance of the magnetic circuit formed by the core and ring thereby altering the inductance of the winding 50.

The operation of the pump/injector will now be described assuming that the various parts are in the position shown in the drawing. In this position and as will be explained, the cylinder 25 is completely filled with fuel and the valve head 28 is in contact with its seating. When the windings 46 are supplied with electric current the armature moves downwardly against the action of the spring 38. The fuel in the cylinder is therefore pressurized by the piston 26 and this pressure acts upon the head 16 of the valve member 15. When the pressure is sufficient the head 16 is lifted from its seating against the action of the spring 20 and fuel flows from the nozzle head, the fuel being atomised during its passage past the valve head. The flow of fuel continues until the piston engages with the valve element 27. As soon as the head 28 of the valve element is lifted from its seating against the action of the spring 31, the pressure of fuel in the cylinder falls to that within the chamber 33. There is, therefore a rapid reduction in the pressure of fuel acting on the valve head 16 and the spring 20 moves the valve head into contact with its seating so that further flow of fuel and in particular unatomised fuel is prevented from leaving the nozzle head. The piston will continue to move downwardly until the part 37 engages with the end of the valve mounting. It has already been mentioned that the presented faces of the ribs 44 and 45 are inclined to the axis of the pump/injector. The purpose of such inclination is to obtain a more linear force/distance characteristic during movement of the armature. The supply of current to the windings may be cut off or reduced before the piston reaches the end of its stroke, the stroke of the piston being completed due to the inertia of the moving parts.

When the winding is de-energized the spring 38 will effect upward movement of the piston and the armature. During such movement it can be expected that the pressure within the cylinder will be lower than that in the chamber 33, and the effect is that the valve head 28 is maintained off its seating by the pressure of fuel in the chamber 33 acting on the valve head. If the maximum volume of fuel is required then the piston is allowed to move its maximum distance under the action of the spring 38 and once movement of the piston has halted and the pressure within the cylinder has become substantially the same as that within the chamber 33, the valve element moves under the action of the spring 31 to the closed position. The pump/injector is then ready for a further delivery of fuel.

If it is required that the pump/injector should deliver less than its maximum volume of fuel then the return motion of the armature under the action of the spring 38 must be halted at some intermediate position. The aforesaid transducer provides a signal indicative of the position of the armature and therefore the piston, and using this signal it is possible to partly energise the windings when the piston has moved by the required amount. Such partial energization of the windings creates sufficient force to hold the armature against the action of the spring 38 but does not pressurise the fuel in the cylinder by an amount sufficient to effect opening of the valve member 15 in the nozzle head. It will be apparent that the filling of the cylinder can take place at any time after the termination of fuel delivery and before the next delivery of fuel is required. It must be remembered however, that filling of the cylinder does take a finite time and therefore it if is decided to fill immediately before delivery of fuel is required, sufficient time must be allowed for filling to take place.

Figure 2:
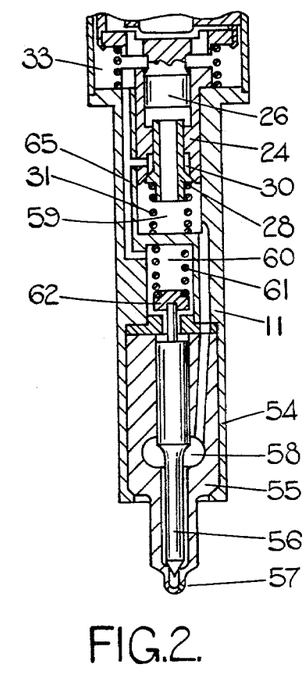

Referring now to FIG. 2 and in which parts which have the same function are provided with the same reference numerals as those parts of FIG. 1.

The pump/injector of FIG. 2 has a different form of nozzle head and in which the valve member opens inwardly as opposed to outwardly as in the example of FIG. 1. In FIG. 2 the nozzle head is indicated at 54 and it comprises a stepped body 55 in which is formed a cylindrical blind bore. The bore at the narrower end of the body defines a seating for engagement by the conical end of a valve member 56. The narrower and projecting portion of the body 55 defines outlet orifices 57 and the flow of fuel through these orifices is controlled by the valve member and takes place when the valve member is lifted from the seating. Formed in the wall of the bore in the body 55 is a circumferential groove 58 and this communicates by way of cooperating passages in the body 55 and also in the body 11, with a chamber 59 which accommodates the spring 31.

A further chamber 60 is provided and this contains a coiled compression spring 61 which is engaged with one end wall of the chamber and has its other end engaging with a spring abutment 62 which itself is located upon a reduced portion of the valve member 56. The chamber 60 communicates with the chamber 33 by way of a passage 63 and a branch passage extends from this passage to the portion 30 of the bore in the valve mounting 24.

In operation, when the piston 26 moves downwardly fuel under pressure acts upon a step defined on the valve member 56 and lifts same against the action of the spring 61. Flow of fuel therefore takes place through the orifices 57 and this flow of fuel continues until the piston 26 lifts the valve head 28 from its seating.

Figure 3:
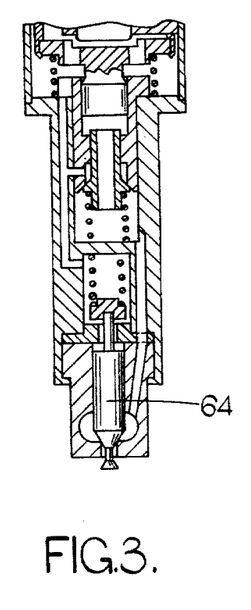

FIG. 2 is only a diagrammatic illustration of the modification and in practice the nozzle head will probably be retained upon the body 11 by means of a retaining nut as in the example of FIG. 1. This also applies to the arrangement shown in FIG. 3 which is essentially the same as the arrangement shown in FIG. 2 with the exception that a different form of nozzle head is provided. In this case the valve member 64 is of the so called "pintle" type which again in the closed position co-operates with a seating but which in the open position, has a reduced portion extending with clearance through a hole disposed at the end of the bore in the nozzle head. When the valve member is lifted fuel flows through the aforesaid clearance.

In some engine applications particularly with the form of nozzle seen in FIG. 1, it may be possible to dispense with the requirement to reduce the pressure at the end of the pumping stroke in this case a simple one way valve is provided to admit fuel into the pumping chamber when the piston is moved by the action of the spring 38.

Figure 7:
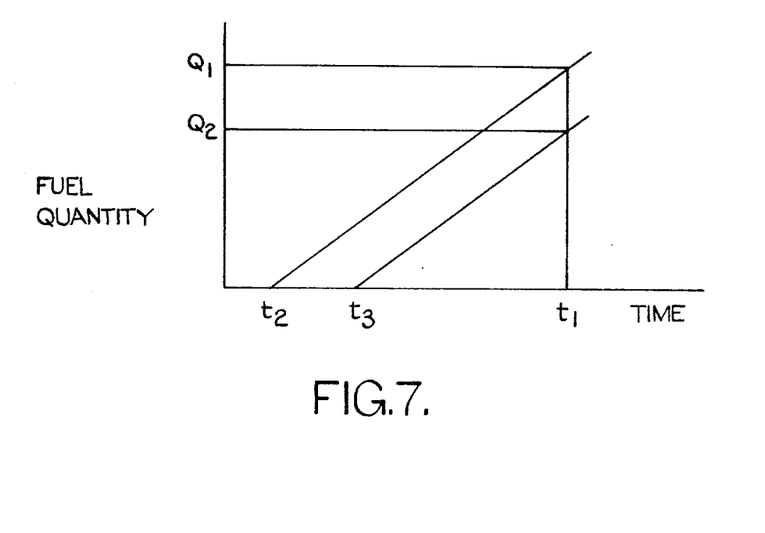
FIG. 7 is a graph to explain the basic concept of the fuel system.

Turning now to FIG. 7, the curve shows the rate of fuel flow into the pumping chamber under the action of the spring 38. Whilst a straight line is shown, in practice, the rate of flow will be influenced by inertia effects and variation in the spring force and also magnetic effect. If the winding 46 of the pump/injector is energized at time $t_1$ then the quantity of fuel which is supplied will be $Q_1$. In order to achieve this the winding must be de-energized to allow filling of the pumping chamber, at time $t_2$. If a smaller quantity $Q_2$ of fuel is required than the winding 31 is de-energized at time $t_3$ which is nearer to time $t_1$ than time $t_2$. Conversely, if an increased quantity of fuel is required the winding 46 would be de-energized at a time earlier than time $t_2$. If it is required to vary time $t_1$ then times $t_2$ and $t_3$ would be altered by the same amount for the quantities $Q_1$ and $Q_2$ respectively.

In practice the curve shown in FIG. 7 may vary when the pump/injector is in use. For example the rate of filling will be reduced if the viscosity of the fuel increases and vice versa. Moreover, with use, the spring will deteriorate so that the rate of filling will decrease. In each of these cases it will be necessary to adjust the instant at which the winding is de-energized in order that the required amount of fuel is supplied at the correct time. The transducer provides a signal representative of the fuel supplied to the bore.

Figure 4:
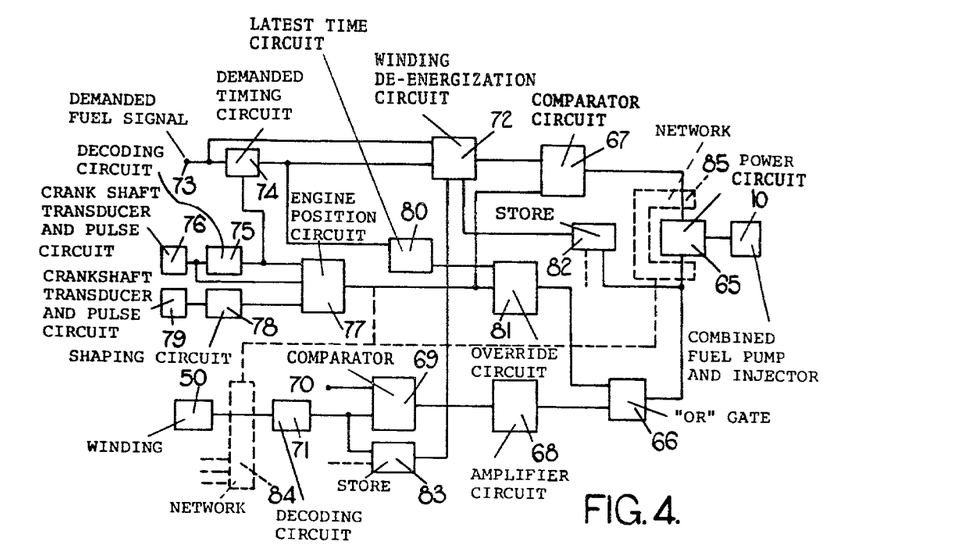
FIG. 4 is a block diagram of a first control system for the pump/nozzle of FIG. 1.

Reference will now be made to FIG. 4 which shows a control system for controlling the operation of a single pump/injector 10 and in which as will be explained fuel takes priority over the timing.

The winding 46 of the pump/injector 10 is supplied with power by means of a power circuit 65. The power circuit is energized to supply power to the winding 46 by means of a first signal obtained at the output of an "OR" gate 66 and is de-energized to cut off the supply of power to the winding 46 by means of a second signal obtained at the output of a comparator 67.

The "OR" gate 66 receives a first signal from the output of an amplifier circuit 68 which in turn receives the output signal from a comparator 69. The comparator 69 compares the demanded fuel signal supplied to a terminal 70 and the derivation of this signal will be explained later, with the actual fuel signal. This latter signal is obtained at the output of a decoding circuit 71 the input of which is connected to the winding 50 of the transducer. The transducer is responsive to the return movement of the pumping piston of the pump/injector. In use when the comparator 69 detects that the actual fuel signal is equal to the demanded fuel signal, the power circuit 65 is energized to supply power to the winding 46 and delivery of fuel takes place. The winding will remain energized until the aforesaid second signal is supplied to the power circuit. This portion of the control circuit therefore causes delivery of fuel when the fuel quantity is correct. The instant of injection may not, however, be correct and this point will be discussed later.

As explained with reference to FIG. 7 it is necessary for the winding 46 to be de-energized a predetermined time before delivery of fuel is required. In order to determine the time which must take into account the amount of fuel to be supplied and also the desired timing of injection, a circuit 72 is provided which receives the demanded fuel signal which is supplied to a terminal 73. In addition the circuit 72 receives a demanded timing signal. This latter signal is provided by a circuit 74 in which is stored information regarding the engine timing required for the range of engine speeds and loads. For this purpose the circuit 74 receives the demanded fuel signal from the terminal 73, this signal being representative of the load on the engine and also a signal indicative of engine speed which is obtained from the output of a decoding circuit 75. The circuit 75 receives a pulse signal from a transducer 76 which is positioned adjacent a toothed or like wheel driven by the crankshaft of the engine. From these two signals the circuit 74 determines the desired timing of delivery of fuel to the engine. The output of the circuit 72 is therefore representative of the time required for the pumping piston to move under the influence of its spring so that the desired quantity of fuel will be contained in the pumping chamber in time for delivery of fuel to take place. The output of the circuit 72 is passed to the circuit 67 which is also supplied with a signal indicative of the position of the piston of the respective combustion chamber which is supplied with fuel by the pump/injector.

The position signal is provided by a circuit 77 which receives the speed signal from the decoding circuit 75, the pulse signal from the transducer 76 and a pulse signal from a shaping circuit 78 which in turn receives a signal from a transducer 79. In the example the transducer 79 provides one pulse every two revolutions of the crankshaft while the transducer 76 provides four pulses per revolution of the crankshaft. When the engine position is appropriate the power circuit 65 is de-energized and the plunger draws fuel into the pumping chamber.

As described when the amount of fuel drawn into the pumping chamber is correct the power circuit is energized and fuel delivery takes place. It could happen that for some reason the flow of fuel into the pumping chamber is retarded and that the delivery of fuel would take place late at an instant which might cause damage to the engine.

An override arrangement is therefore provided which whatever the amount of fuel contained in the pumping chamber, causes delivery of fuel. For this purpose circuits 80 and 81 are provided which can under such circumstances provide an input to the "OR" gate 66. Circuit 80 receives the desired timing signal from the circuit 74 and calculates the latest time at which delivery of fuel can take place. The output signal from this circuit is then passed to circuit 81 which is similar to circuit 67, and this will provide an input signal to the "OR" gate 66 to cause delivery of fuel. This signal will in fact be provided at each cycle but in normal circumstances delivery of fuel will already have taken place.

Let us now suppose that the filling of the pumping chamber has taken slightly longer than anticipated. This means that delivery of the correct quantity of fuel will have taken place slightly later than desired. In order to correct this it is necessary to de-energize the winding 46 slightly earlier and this is achieved by the circuit 72 which receives information regarding the previous timing of delivery from a store 82.

It is convenient to supply the circuit 72 with information regarding the amount of fuel delivered during the previous cycle and this information is provided by a store 83. This will enable the circuit 72 to correct the quantity of fuel delivered more quickly in the case where the circuit 80 and 81 operate to energize the winding 46.

The circuit as described is for controlling one pump/injector. However, by providing multiplexing networks 84 and 85 intermediate the transducers 50 and the decoding circuit 71 and the input to the power circuits 65, the circuit can control the operation of a number of pump/injectors. The networks 84 and 85 receive the engine position signals from the output of the circuit 77. In addition it is necessary to provide as many of the stores 82, 83 as there are pump/injectors to ensure that when the circuit 72 is determining the de-energizing time for a particular pump/injector it is the information stored relative to that injector which is utilized.

Figure 5:
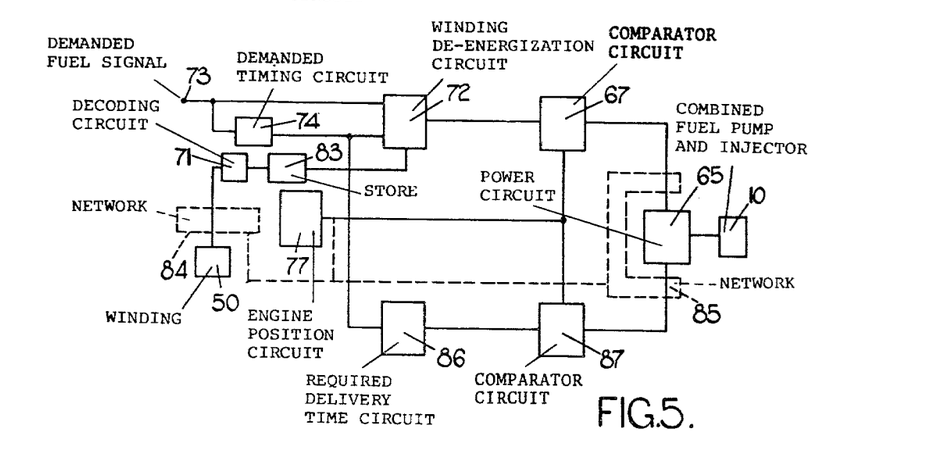
FIG. 5 is a block diagram of a second control system for the pump/nozzle of FIG. 1.

Turning now to the control circuit of FIG. 5. This circuit is different to that of FIG. 4 in that it ensures delivery of fuel at the desired time irrespective of whether the amount of fuel in the pumping chamber is correct.

Portions of the control circuit of FIG. 5 which perform the same function as the portions of the circuit of FIG. 4 have been assigned the same reference numerals.

The demanded timing signal from the circuit 74 is utilized to determine in circuit 86, the required instant of delivery of fuel. This signal is fed to a circuit 87 which also receives an engine position signal from the circuit 77. The circuit 87 functions in the same manner as the circuit 67 except of course that it determines the instant when the winding 46 is energized to cause delivery of fuel. As explained the delivery of fuel always takes place at the required time but it is possible that the amount of fuel may be incorrect. The circuit 72 will however correct this by altering the de-energization point of the winding 46 on the basis of the actual fuel signal provided by the store 83.

As with the circuit of FIG. 4, the circuit of FIG. 5, with the addition of multiplexing networks 84 and 85, can be utilized to control the operation of a number of pump/injectors. Again there must be as many of the stores 83 as there are pump/injectors.

In both the circuits described the time during which delivery of fuel takes place is a function of the power input to the winding 46 and may therefore be varied by variation of the power input. This can be made to vary in accordance with the engine speed. In one arrangement the supply of power to the winding is in the form of current pulses, and in order to vary the power input, the pulse rate of the pulse height may be varied. Conveniently when energising the winding to effect delivery of fuel an initial large pulse is supplied to obtain rapid initial movement of the various parts followed by a series of small pulses and it is these pulses which would be altered to obtain variation in the delivery period. It will be understood that the delivery of fuel does not take place immediately after the winding is energized. There are a number of reasons for this and the resultant delay must be taken into account when determining the required timing of delivery. When the winding is energized the current, and therefore the magnetic flux, takes time to rise to a value at which the armature starts to move. In addition, before delivery of fuel can take place the fuel in the pumping chamber must be pressurized a sufficient amount to cause the valve head 16 in the case of FIG. 1, to be lifted from its seating. Moreover, the supply of current to the winding 46 is reduced before the end of the stroke of the piston. The piston continues to move due to its inertia and also because the magnetic flux does not reduce immediately the supply of current is halted. It must also be realised that when the winding is de-energized prior to filling the pumping chamber with fuel, the flux does not die away immediately and this will slow the initial movement of the piston under the action of the spring 38.

Figure 6:
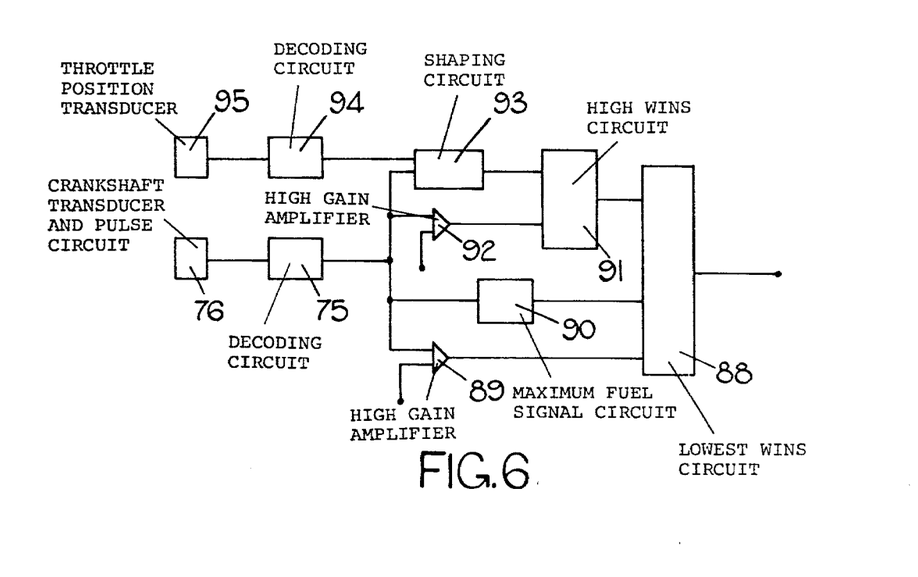
FIG. 6 is a block diagram of an electronic two speed governor.

Reference will now be made to FIG. 6 which shows a circuit for providing the demanded fuel signal to the terminals 70 and 73. The circuit of FIG. 6 provides a two speed governing effect and includes a lowest wins circuit 88 the output of which constitutes the fuel demand signal. The circuit 88 has three inputs the lowest of which is selected by the circuit for supply as the fuel demand signal.

One input of the circuit 88 is connected to the output of a high gain amplifier 89 provided with feedback. One input of the amplifier is provided with a reference signal representative of the maximum allowed engine speed while the other input is supplied with the actual engine speed signal from a decoding circuit shown as the decoding circuit 75 of FIG. 4.

The second input of the circuit 88 is connected to a circuit 90 which also receives the speed signal and provides a signal representing the maximum fuel signal throughout the speed range of the engine.

The third input of the circuit 88 is connected to the output of a high wins circuit 91 which has two inputs. The first input is connected to the output of a high gain amplifier 92 provided with feedback and having two inputs one of which receives a reference signal representing the desired engine idling speed and the other of which receives the engine speed signal. The second input of the circuit 91 is connected to the output of a shaping circuit 93 which receives the engine speed signal and also a signal from a decoding circuit 94 which in turn receives a signal from a transducer 95 associated with an engine operator adjustable control e.g. the throttle pedal in the case of a road vehicle.

In operation at engine idling speeds the amplifier 89 is operative to determine the demanded fuel signal at the output of the circuit 88 since with no demand on the part of the operator, the output from the amplifier will be larger than the output from the shaping circuit but smaller than the outputs of the circuit 90 and the amplifier 89. When the operator places a demand on the engine by depressing the throttle pedal, the output of the shaping circuit 93 becomes higher than the output of the amplifier 92. If only a small demand is made then the signal from the circuit 91 will still be lower than those provided by the circuit 90 and the amplifier 89. Hence the driver will control directly the amount of fuel supplied to the engine and with an increased flow of fuel the engine will accelerate. If the operator makes a large demand on the engine then it is likely that the output of the circuit 91 will be greater than the output of the circuit 90 in which case the rate of fuel supply will be controlled by the circuit 90 until the output of the circuit 91 becomes smaller thereby restoring the control of the fuel supply to the operator. If the maximum allowed engine speed is attained then the output of the amplifier 89 becomes less and the fuel supply to the engine will be reduced to control the speed of the engine. The shaping circuit 93 is arranged to modify the apparent demanded fuel in accordance with the increase in the engine speed to provide feedback to the operator of the engine. Furthermore the idling speed may be modified in accordance with variation in low fuel demand on the part of the operator. This provides a smooth transition from the control by the amplifier 92 to the control by the circuit 91 and eliminates "lost motion" in the operator adjustable control.

The governor circuit may be modified in many ways to provide, for example, a change in the idling speed with engine temperature, modification of the maximum fuel delivery in accordance with the ambient air pressure and/or temperature, modification of the maximum fuel delivery with the pressure in the air inlet manifold of the engine, additional fuel for starting the engine when cold and modification of the fuel level for starting when the engine is hot.

FIG. 6 shows a two speed governor arrangement for providing the fuel demand signal to terminals 70 and 73. It will be understood that the circuit of FIG. 6 may be replaced by an all speed governor circuit or an isochronous governor circuit.

In addition, the control systems as described with reference to FIGS. 4 and 5 may be utilized to provide ignition control signals when the associated engine is a spark ignition engine. The timing of delivery of fuel may also be modified for starting purposes in accordance with the engine temperature.

We claim:

1. A fuel system for an internal combustion engine of the type in which fuel is injected into a combustion space of the engine, the system comprising an injection nozzle positioned on the engine so that fuel delivered to the nozzle will be injected into the combustion space, an injection pump for delivering fuel to the nozzle in timed relationship with the associated engine, said pump comprising a piston movable in a bore to vary the size of a pumping chamber, resilient means biasing the piston in a direction to increase the size of the pumping chamber, electromagnetic means operable to move the piston against the action of the resilient means to displace fuel from the pumping chamber through the associated nozzle, a valve controlled fuel inlet to said pumping chamber and through which fuel can flow into the bore from a source of fuel when the piston is moved by the action of the resilient means, the system including first electronic means for supplying power to the electromagnetic means when delivery of fuel by the pump is required, second electronic means for providing a first control signal to said first electronic means when it is desired to energize the electromagnetic means, third electronic means for providing a second control signal to said first electronic means to cut off the supply of power to said electromagnetic means thereby to allow fuel to flow into the pumping chamber, said third electronic means being operative to determine from signals supplied to it, the time required for the pumping chamber to fill with the desired quantity of fuel thereby to determine the instant the second control signal is supplied, fourth electronic means for determining the desired amount of fuel to be supplied to the engine and fifth electronic means for determining the desired timing of delivery of fuel, the signals provided by said fourth and fifth electronic means being supplied to said third electronic means, and said fifth electronic means comprising a store in which is stored information regarding the required timing of delivery of fuel for different engine speeds and load, said fifth electronic means receiving a signal from said fourth electronic means and also a signal indicative of the speed of the associated engine.

2. A fuel system according to claim 1, including sixth electronic means for providing an engine position signal, said engine position signal being supplied to said third electronic means.

3. A fuel system according to claim 2, including a transducer for providing a signal indicative of the position of the piston, said signal being supplied to said second electronic means together with a signal from said fourth electronic means whereby when said actual fuel signal equals the demanded fuel signal said second electronic means will provide said first control signal.

4. A fuel system according to claim 3, in which said second electronic means includes an "OR" gate through which said first control signal can pass, the system including seventh electronic means to which are supplied signals from said fifth and sixth electronic means, said seventh electronic means calculating the lastest time at which said first control signal can be supplied to the first electronic means, the output of said seventh electronic means being supplied to said "OR" gate whereby said first electronic means will supply power to said winding even if the required quantity of fuel has not been supplied to the pumping chamber.

5. A fuel system according to claim 4, including a pair of stores for storing information regarding the amount of fuel delivered in the previous cycle of the pump and the timing of delivery of fuel respectively, the information contained in said stores being supplied to said third electronic means so that the instant at which the second control signal is supplied to the first electronic means can be adjusted.

6. A fuel system according to claim 5, in which said fourth electronic means comprises a governor circuit which receives signals indicative of a demanded engine operating parameter and the speed of the associated engine.

7. A fuel system according to claim 2, in which the output of said sixth electronic means is supplied to said second electronic means whereby delivery of fuel will take place to the engine even if the required quantity of fuel has not been supplied to the pumping chamber.

8. A fuel system according to claim 7, including a transducer for providing a signal indicative of the position of said piston, said signal being supplied to said third electronic means.

9. A fuel system as claimed in claim 8, in which said fourth electronic means comprises a governor circuit which receives signals indicative of a demanded engine operating parameter and the speed of the associated engine.

10. A fuel system as claimed in claim 4 or claim 9, including a plurality of transducers and a plurality of said first electronic means for supplying signals to a plurality of said electromagnetic means, said system including matrix circuits interposed between said transducers and a decoding circuit, and between said second and third electronic means and said first electronic means.

* * * * *